April 9, 1957  U. NISTRI  2,787,936
MAP PLOTTING DEVICES WITH DIRECT OPTICAL PROJECTION MEANS
Filed April 7, 1954
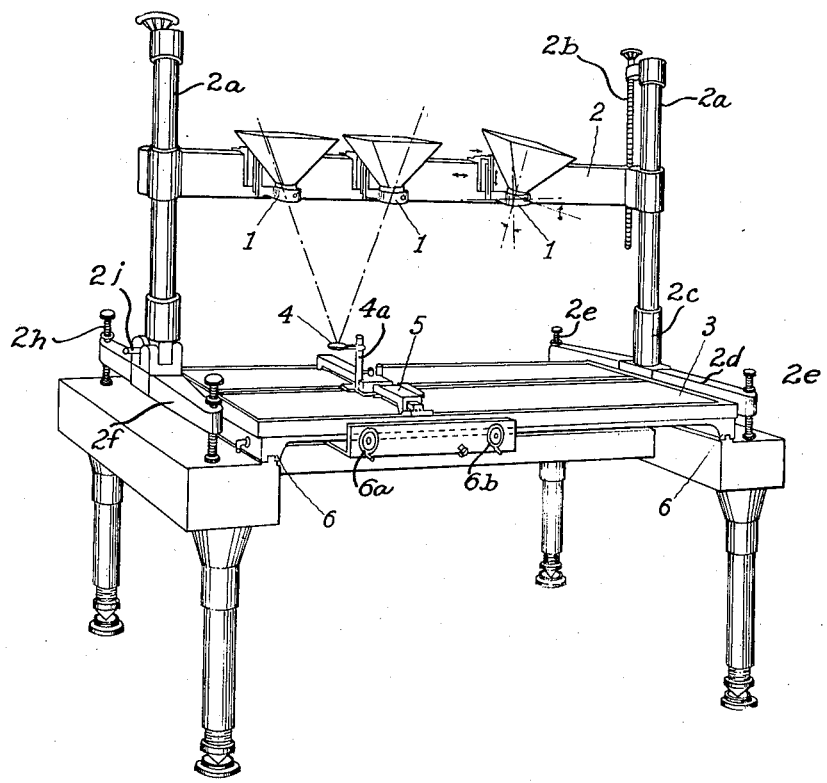
INVENTOR
UMBERTO NISTRI
By Robb+Robb
attorneys

United States Patent Office 2,787,936
Patented Apr. 9, 1957

2,787,936
MAP PLOTTING DEVICES WITH DIRECT OPTICAL PROJECTION MEANS

Umberto Nistri, Rome, Italy

Application April 7, 1954, Serial No. 421,585

3 Claims. (Cl. 88—24)

An arrangement of plotting devices with the optical axes of the cameras vertically arranged in order to project the image on horizontal planes is known.

However, if the transverse size of the camera is a very large one as it is the case for cameras with large angles, it is difficult to observe the coincidence of the homologous rays forming the optical model because there are points arranged in the centre of the strips.

This invention has the purpose of allowing with any width of the optical model a distance of observation never higher than that for easy vision without changing the reciprocal position of the projectors.

Where it is desirable and necessary to plot a large sized optical model, the zone near the vertical of the camera is difficult to plot because the operator must normally stand or be positioned so far therefrom and must very nearly get on the reference plane. This invention contemplates the transverse displacement of a table, along the Y axis, so that the operator may place himself at the preferred observation distance of 25–30 cm. from the vertical on the plane which is coupled with the point in which the photograph was taken.

Figure 1 illustrates the invention in perspective, showing various mechanical elements involved therein.

In Fig. 1, the cameras 1 of a photogrammetric plotting apparatus are arranged on the common beam 2 with their axes approximately vertical. The cameras 1 are supported on the beam 2 so as to be adjustable with relation thereto, the beam 2 in turn being vertically adjustable on the columns 2a by any suitable means such as the screw indicated at 2b. The columns 2a are in turn fastened at one end in a socket member 2c to a transverse rail 2d, the rail 2d being adjustable at its opposite ends as by means of the screws 2e.

The other column 2a is adjustable as by means of the beam 2f, the said beam in turn being supported by the screws 2h therefore and the column 2a being pivotally connected at the center of the beam approximately at 2j.

Further describing the apparatus as a whole, it will be seen that the table 3 which is the levelled plane of the optical model, is supported upon suitable guides 6 at opposite ends so as to move transversely so to speak or from front to rear as viewed in the drawing, as by means of a suitable hand-wheel control 6a therefor. The mechanism which is suitable for operating the table or plane 3 as above referred to is common and no particular invention is claimed therein, the co-ordinate measuring apparatus generally denoted 5 being likewise carried on the table and operable with respect thereto as is well known as by means of the screw operating handle 6b. The mark bearing screen 4 is supported upon a suitable post 4a which post is in turn carried by the apparatus 5 and movable therewith as necessary to align the mark.

While no particular means are shown to provide for adjustment of the cameras 1, it is obvious that any suitable means may be provided whereby the adjustment of the same may be obtained. 3 is the levelled plane of the optical model as it results from the absolute and reciprocal orientation of the photograms contained in the cameras.

Screen 4 which carries the mark is moved on plane 3 by means of a manual or an electrical control.

After having used plane 3 and the pertinent support guides of the co-ordinate measuring apparatus 5 which carries the mark bearing screen 4 for the formation or the orientation of the optical model, plane 3 may be displaced by means of the side guides 6 and removed along the Y axis so that one of its sides may be suitably and at will brought towards the central area of the model thus allowing the mark to be placed in a suitable position so that it is easily seen.

Since plane 3 carries the co-ordinate measuring apparatus, the mark carrying screen has of course to be brought back along the BY axis into the position where the movement of plane 3 started along guides 6 which are designed parallel to the Y axis of the co-ordinate measuring apparatus.

What I claim is:

1. In plotting apparatus of the class described in combination, projection devices having their main axes approximately vertical and adapted to project images on a screen moving in a horizontal plane, means for adjusting said devices, means providing a leveled plane of the optical model projected by the projection devices on said screen, means for supporting the screen on said leveled plane in operative relation thereto on supporting guides for movement transversely and longitudinally of the map drawing sheet, and hand wheel control means for moving the mark bearing screen and map marker into alignment therewith and over the leveled plane of the optical model projected by the projection devices, co-ordinate measuring apparatus movable in the horizontal plane aforesaid, said apparatus being movable in the plane and along the Y axis of the system, and said plane being formed by a movable table which remains in the plane during movement thereof.

2. Plotting apparatus as claimed in claim 1 wherein the movement of the plane along the Y axis of the system may be controlled in increments by screw means.

3. In plotting apparatus as claimed in claim 1 wherein the co-ordinate measuring apparatus comprises an infinitely adjustable device movable with the plane and transversely thereof.

References Cited in the file of this patent

UNITED STATES PATENTS

| 1,937,711 | Nelles et al. | Dec. 5, 1933 |
| 1,980,657 | Bauersfeld | Nov. 13, 1934 |
| 2,085,498 | Horner | Jan. 29, 1937 |
| 2,200,594 | Diggins et al. | May 14, 1940 |
| 2,451,031 | Kelsh | Oct. 12, 1948 |
| 2,461,567 | Pennington | Feb. 15, 1949 |
| 2,492,870 | Kelsh | Dec. 27, 1949 |